(12) United States Patent
Hawkins et al.

(10) Patent No.: US 12,398,697 B2
(45) Date of Patent: Aug. 26, 2025

(54) CONTROL OF ENERGY STORAGE SYSTEMS

(71) Applicant: Siemens Gamesa Renewable Energy A/S, Brande (DK)

(72) Inventors: Samuel Hawkins, Vejle (DK); Michael Stoettrup, Herning (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/692,364

(22) PCT Filed: Sep. 20, 2022

(86) PCT No.: PCT/EP2022/076023
§ 371 (c)(1),
(2) Date: Mar. 15, 2024

(87) PCT Pub. No.: WO2023/046654
PCT Pub. Date: Mar. 30, 2023

(65) Prior Publication Data
US 2024/0376861 A1   Nov. 14, 2024

(30) Foreign Application Priority Data
Sep. 24, 2021 (EP) .................................. 21198794

(51) Int. Cl.
*F03D 9/11*   (2016.01)
*H02J 3/00*   (2006.01)
*H02J 3/38*   (2006.01)

(52) U.S. Cl.
CPC ................ *F03D 9/11* (2016.05); *H02J 3/003* (2020.01); *H02J 3/38* (2013.01); *H02J 2300/28* (2020.01)

(58) Field of Classification Search
CPC ..... F03D 9/11; H02J 3/003; H02J 3/38; H02J 2300/28
See application file for complete search history.

(56) References Cited

U.S. PATENT DOCUMENTS 10,697,432 B2 * 6/2020 Venkitanarayanan .... H02J 3/14
2015/0240784 A1    8/2015 Sagi et al.

FOREIGN PATENT DOCUMENTS

EP      3098929 A1     11/2016
WO   2013013174 A2     1/2013

OTHER PUBLICATIONS

PCT International Search Report and Written Opinion of International Searching Authority mailed Nov. 23, 2022 corresponding to PCT International Application No. PCT/EP2022/076023 filed Sep. 20, 2022.

* cited by examiner

*Primary Examiner* — Carlos Amaya
(74) *Attorney, Agent, or Firm* — Schmeiser, Olsen & Watts LLP

(57) ABSTRACT

A method of controlling an operation of energy storage systems of a wind park is provided. The wind park includes a plurality of energy storage systems each of which is associated with a wind turbine comprised by the wind park. Further, each of the plural energy storage systems is configured to be operable to provide electrical energy to an auxiliary system of the associated wind turbine. The method includes obtaining for each of the energy storage systems storage system state information indicating an availability of the energy storage system to store and/or provide electrical energy and operating the plural energy storage systems as a combined energy storage system based on the obtained storage system state information. The method further includes controlling the providing of electrical energy from (Continued)

the combined energy storage system and/or the storing of
electrical energy in the combined energy storage system.

15 Claims, 3 Drawing Sheets

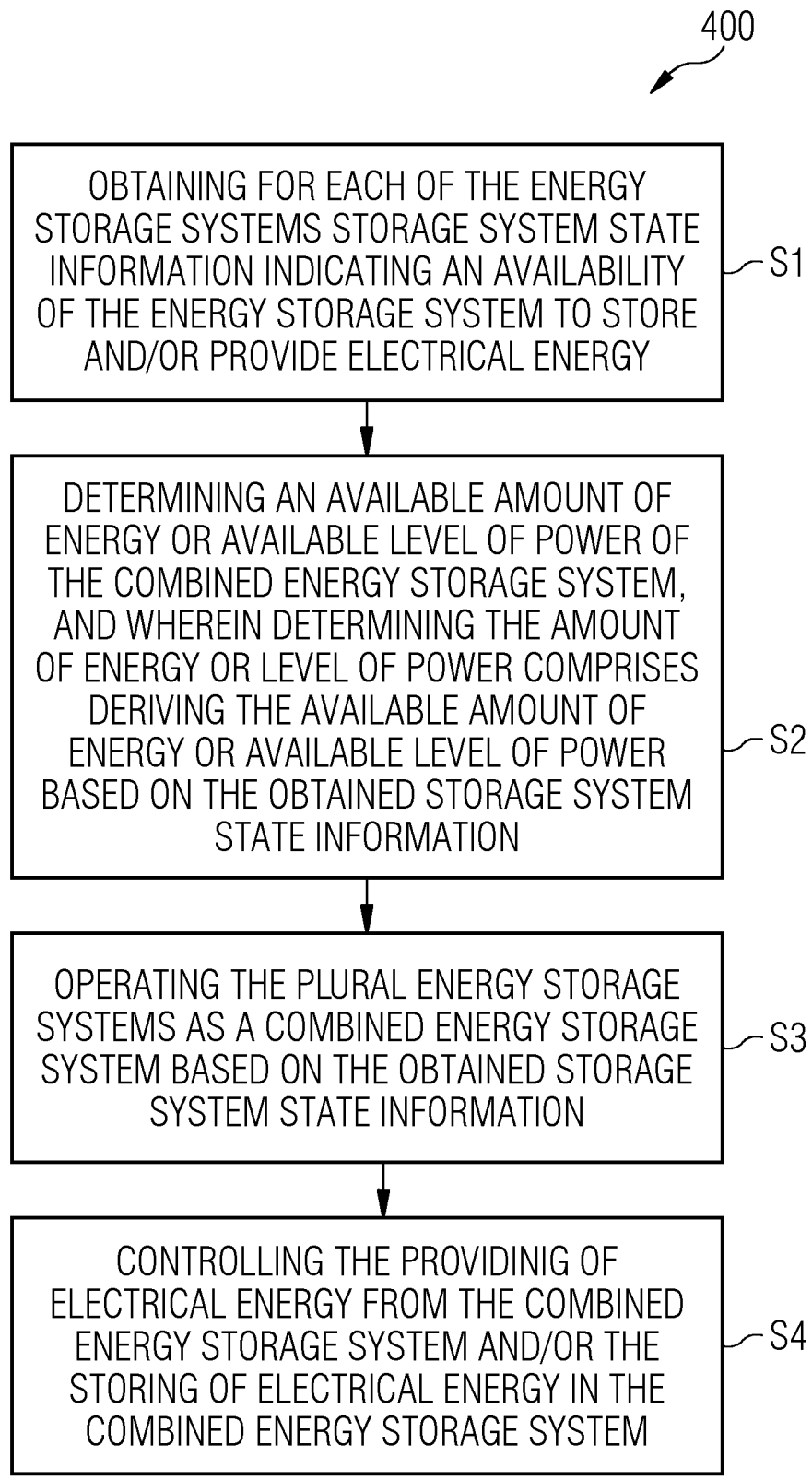

CONTROL OF ENERGY STORAGE SYSTEMS

CROSS-REFERENCE TO RELATED APPLICATIONS

This application claims priority to PCT Application No. PCT/EP2022/076023, having a filing date of Sep. 20, 2022, which claims priority to EP Application No. 21198794.6, having a filing date of Sep. 24, 2021, the entire contents both of which are hereby incorporated by reference.

FIELD OF TECHNOLOGY

The following relates to a method of controlling an operation of energy storage systems of a wind park. It further relates to a computer program for performing such method and a control system configured to carry out such method.

BACKGROUND

Energy storage systems are incorporated in wind parks for several purposes. The dimension of each of the energy storage systems is typically designed in dependence on the individual intended use case. An energy storage system may for example be used in order to supply power to one or more wind turbines or to specific components thereof to maintain their operation during periods in which the grid power supply is absent. Further, energy storage systems are known that buffer produced energy.

The different use cases result in different performance requirements on the energy storage systems. For example, a typical energy storage system that is used to supply power to a wind turbine may have a power rating in the area of 0.25 MW and a total capacity in the area of 0.15 MWh. An energy storage system that is used for buffering produced energy may have a power rating in the area of 150 MW and a total capacity in the area of 190 MWh. As a consequence, an energy storage system is in general limited to serve that purpose for which it is dimensioned or at least limited to such purposes the energy storage system may serve with respect to its performance specification. The necessity of differently dimensioned energy storage systems results further in a high hardware and maintenance effort, as well as a complex control system required to control the different energy storage systems. Furthermore, conventional energy storage systems with high power or capacity specifications require a large amount of space, which may be limited, especially for offshore wind parks.

The document WO 2013/013174 A2 describes a dispatchable renewable energy generation, control and storage facility, wherein plural wind turbine generators with integrated energy storage devices are connected to a collection point to feed power into the grid. In low wind conditions, power from the energy storage device can be fed into the grid to compensate for the low wind conditions.

The document US 2015/0240784 A1 describes a wind farm controller that controls a plurality of energy storage elements. The wind farm controller generates both a farm-level storage power setpoint and individual storage power set points for the plurality of energy storage elements, which are used to control the plurality of energy storage elements.

The document EP 3098929 A1 describes a power generation system that comprises a plurality of energy storage units that are connected to respective power generation units, such as wind turbine generators. If a power generation unit is disconnected from the grid, the respective energy storage unit is connected to a different power generation unit so that its capacity can be used for storing energy.

SUMMARY

An aspect relates to improving the storing of energy in a wind park.

According to an embodiment of the invention, a method of controlling an operation of energy storage systems of a wind park is provided. The wind park comprises a plurality of energy storage systems each of which is associated with a wind turbine comprised by the wind park. Further, each of the plural energy storage systems is configured to be operable to provide electrical energy to an auxiliary system of the associated wind turbine. In embodiments, the method comprises obtaining for each of the energy storage systems storage system state information indicating an availability of the energy storage system to store and/or provide electrical energy and operating the plural energy storage systems as a combined energy storage system based on the obtained storage system state information. In embodiments, the method further comprises controlling the providing of electrical energy from the combined energy storage system and/or the storing of electrical energy in the combined energy storage system.

Such method allows the providing of electrical energy for services of different power levels. For example, it allows supplying the electrical components of a wind turbine with electrical energy in periods during which the wind park is disconnected from the grid and allows supplying a grid with electrical energy in periods during which the wind park is connected to the grid. Energy storage systems with high performance specifications are no longer required and may be emulated by a plurality of energy storage systems having lower performance specifications. For example, 100 units of the 0.25 MW/0.15 MWh energy storage systems mentioned above may be operated as a combined energy storage system capable of operating as a 25 MW/15 MWh energy storage system. As a consequence, the hardware effort in a wind park may be reduced and, accordingly, the maintenance effort of the hardware implemented in the wind park may be reduced. Costs may be reduced correspondingly.

In an example, each of the energy storage systems may be configured to power the auxiliary system of the associated wind turbine when the wind turbine is disconnected from a power grid. The combined energy storage system may be controlled to provide the electrical energy from the combined energy storage system to the power grid and/or to a load. The controlling may include maintaining a reserve margin of energy in at least some, or each of the energy storage systems. The reserve margin of energy may be an amount of energy reserved for powering the auxiliary system of the associated wind turbine when the wind turbine is disconnected from the power grid. By such method, in case of a disconnection from the power grid, one or more auxiliary systems, such as a yaw drive, blade pitch drive, a control and communication system, a cooling system and/or other auxiliary systems may continue to be powered from the energy storage system of the wind turbine. By maintaining a reserve margin in the energy storage system, it may be ensured that the auxiliary system of the respective wind turbine can be operated from the stored energy. e.g., for a certain period of time that may be preset or may be determined dynamically. It should be clear that the method steps may be performed by the same or different controllers. For example, the reserve margin may be maintained by a wind turbine controller or energy storage system controller, while the power exchange between the combined energy storage system and the grid may be controlled by a wind park controller.

In an embodiment, the wind park comprises sets of wind turbines, wherein a set comprises at least two wind turbines, and each set is associated with one of plural energy storage systems. An energy storage system of the plural energy storage systems may then be configured to be operable to provide electrical energy to auxiliary systems of the set of wind turbines with which the energy storage system is associated.

In an embodiment, each of the plural energy storage systems may be associated with a different wind turbine or a different set of wind turbines.

The energy storage system may be a battery-based energy storage system, in particular based on lithium-ion technology. However, it may also be based on other energy storage media that can be (re-)charged by receiving electrical power and discharged by providing electrical power. For example, the energy storage system may be based on hydrogen or compressed air technology or comprise super-capacitors.

It should also be clear that the energy storage systems may not correspond to each other. The individual energy storages may be based on different energy storage technology and may have different performance specifications.

The energy storage system may be located at, in or near the associated wind turbine.

The energy storage system may be incorporated into the electrical system of the associated wind turbine, such that it is capable of supplying power to the grid and to the wind turbine auxiliary system.

The combined energy storage system is a distributed energy storage system which may be composed of at least a portion of the energy storage systems of the wind park. Thus, the combined energy storage system is an emulated energy storage system with a greater power rating and/or a greater capacity rating than at least one of the individual energy storage systems.

The electrical energy that may be provided/stored by an individual energy storage system is limited to an energy capacity thereof. The electrical energy which may be processed by the combined energy storage system may thus be limited to the sum of the energy capacities of the energy storage systems, in particular to an available portion thereof. A power capability of the combined energy storage system may be limited correspondingly.

The plural energy storage systems may be operated such that the combined energy storage system has at least one of a power rating greater than a power rating of at least one of the plural energy storage systems and an energy capacity greater than an energy capacity of at least one of the plurality of energy storage systems.

The wind park may comprise additional energy storage systems and besides the plurality of energy storage systems. Accordingly, in such embodiment only a portion of the energy storage systems of the wind park are operated as the combined energy storage system.

The energy storage systems of the wind park may be charged by extracting energy from the grid during grid-connected periods or by at least a portion of the power which is generated by the associated wind turbine.

According to an embodiment, the energy storage systems are charged by energy produced by the wind turbines during periods of high wind speeds or during predefined charging periods (e.g., during nighttime), and/or discharged during periods of low wind speeds or during predefined discharging periods (e.g., during in pdaytime). Overproduced energy, e.g., during periods of high winds, is hence stored for later use. This increases the efficiency of the wind park.

The storage system state information may comprise a parameter of an energy storage system that is indicative of at least one of a charging state, an amount of energy available to be provided and/or stored, a health state, a reserve margin, nameplate capacity.

The charging state may be a state-of-charge (SoC) of the energy storage system, which is a percentage of the available energy relative to the total capacity of the energy storage system.

The nameplate capacity may be the total energy storage capacity of the energy storage system at the time of manufacture.

The health state may be a state-of-health (SoH) of the energy storage system which is a percentage of the actual energy storage capacity relative to the capacity of the energy storage system at the time of manufacture (i.e., the nameplate capacity). The state-of-health typically degrades over time and use and may reduce from 100% to 70% (end-of-life of the energy storage). For example, an energy storage system with a nameplate capacity of 100 kWh degrades in capacity from 100 kWh to 70 kWh over the system lifetime.

The reserve margin may be the energy that is not available to be provided by the combined energy storage system, i.e., a capacity that does not form part of the combined energy storage system, e.g., that is not available for use by the combined energy storage system. The reserve margin may comprise an amount of energy that is reserved for safety or system integrity purposes. The reserve margin may further comprise an amount of energy required for power supplying at least the associated wind turbine while the wind turbine may not be supplied by an external grid, i.e., during periods of being disconnect from such external grid. The reserve margin may for example be used to operate an auxiliary system of the associated wind turbine, for example to perform wind tracking by operating the yaw drive and to power control and communication equipment.

The storage system state information may additionally or alternatively comprise status information about the energy storage system from which the information is obtained, e.g., information of non-availability when the available amount of energy is consumed, information about an actual operation of the energy storage system or information about an actual operation of the associated wind turbine of the energy storage system.

The storage system state information may be obtained directly from the plural energy storage systems, more specifically for each of plural energy storage systems. It may for example be received from an associated energy storage system controller or via the associated wind turbines, more specifically, it may be received for each wind turbine from an associated wind turbine controller. The storage system state information may for example be obtained via an Ethernet or Profinet communication channel which is used to exchange information.

According to an embodiment, the method further comprises operating the plural energy storage systems such that each energy storage system provides electrical energy to the associated wind turbine when the wind park is disconnected from a power grid.

It is noted that it may herein be referred to a second operation mode in which the wind park/one or more wind turbines of the wind park is/are operated. It is noted that the second operation mode may be a grid disconnected operation mode in which the wind park/one or more wind turbines of the wind park is/are disconnected/uncoupled from the grid. Correspondingly, it may be referred to a first operation mode which may be a grid connected operation mode in which the wind park/one or more wind turbines of the wind park may be operated when the wind park/one or more turbines of the wind park is/are electrically connected/ coupled to a grid with which the wind park/one or more turbines of the wind park may exchange electrical power.

According to an embodiment, each energy storage system is configured to be operable to provide electrical energy to a power grid and/or a load and the method comprises controlling the combined energy storage system to provide stored electrical energy to the power grid and/or load, and/or to store electrical energy received from the power grid.

According to an embodiment, the method comprises performing a grid service by the controlling of the combined energy storage system. The grid service may be at least one of a grid black start, a grid frequency support, a reactive power support, a virtual inertia, and energy arbitrage.

The grid service may for example relate to the storing of electrical energy from the grid in the combined energy storage system when such energy is available (e.g., when there is a sufficient supply or oversupply with electrical energy on the grid), and releasing stored electrical energy from the combined energy storage system into the grid when there is a demand for electrical energy on the power grid (e.g., when there is a high demand by loads connected to the grid or an undersupply on the grid). Indications for an availability or demand for electrical energy on the grid may for example be the grid frequency (which drops if there is insufficient supply). Supplying and withdrawing electrical energy from the grid according to such grid service may accordingly result in a stabilization of the grid, in particular the grid frequency.

The grid frequency support may for example allow reacting to fluctuations in the grid frequency. The grid frequency support may further relate to operations associated with the Frequency Containment Reserve (FCR)/Frequency Restoration Reserve (FRR).

Another indication of oversupply/undersupply on the grid may be electricity price, for energy arbitrage. Low electricity price may in particular indicate an oversupply on the grid, i.e., a low demand for energy on the grid. High electricity price may indicate a high demand for energy on the grid. The energy demand may for example be identified by discovering the electricity price on trading markets, in particular by discovering the electricity price on trading markets of various timescales (e.g., daily and intraday markets). Accordingly, providing a grid service in form of energy arbitrage may including storing electrical energy from the grid in the combined energy storage system when electricity price is low and releasing stored electrical energy from the combined energy storage system into the grid when electricity price is high. This way, the combined energy storage system may contribute to the grid stability and/or income for the wind farm operator is increased.

The energy storage system may for example supplement the power provided by the wind turbine to the grid, or independently supply power to the grid during periods in which the wind turbine is out of operation due to low/high wind speeds, manual shutdown commands, or turbine faults.

According to an embodiment, the combined energy storage system is controllable to provide and/or store electrical energy to perform a plurality of services, wherein a first service is associated with a higher priority than a second service. In embodiments, the method may further comprise providing a larger fraction of a storage capacity of the combined energy storage system for the first service than for the second service, and/or reserving a predetermined amount of storage capacity of the combined energy storage system for use by the first service.

In an embodiment, the combined energy storage system is controllable to provide and/or store electrical energy to perform a plurality of services. A first service may be associated with a higher priority than a second service and the method further comprises controlling the providing and/or storing of electrical energy such that a higher amount of energy is exchanged for the first service compared to a second service.

In an embodiment, the plurality of services may be a plurality of grid services.

More specifically, the method may comprise prioritizing the different grid services. As an example, 80% of the available energy may be used for energy arbitrage and 20% for frequency support, and/or 70% of the available power may be used for arbitrage and 30% for frequency support.

According to an embodiment, the method further comprises monitoring one or more prediction parameters to generate one or more monitored prediction parameters, predicting based at least on the one or more prediction parameters a schedule of upcoming energy demands of providing and/or storing electrical energy, and adjusting the controlling of the providing and/or storing of the combined energy storage system based on the schedule.

Monitoring may herein for example be performed—but is not limited to—by at least one of a sensor, a sensoring system and a model or a filter-based monitoring system, which may for example be a state observer, Kalman filter or the like. Monitoring may further comprise signal pre- and post-processing, e.g., filtering.

The schedule may for example be predicted over a period of days, hours, or minutes.

The prediction parameter may for example be a time of day, a weather forecast, or an electricity pricing.

The upcoming energy demand may be an upcoming required amount of energy and/or an upcoming required amount of power.

In particular, the upcoming energy/power demand may comprise an upcoming amount of energy or level of power required for one or more grid services.

Such predicting ensures that a required amount of energy is available and therefore increases the reliability.

According to an embodiment, the method further comprises determining an available amount of energy or available level of power of the combined energy storage system. Determining the amount of energy or level of power may comprise deriving the available amount of energy or available level of power based on the obtained storage system state information.

Deriving the available amount of energy or available level of power of the combined energy storage system may further be based on additional parameters, e.g., energy losses in the wind park or other parameters which may have an influence on the energy flow in the wind park. In embodiments, the method may further comprise determining such additional parameters, e.g., by monitoring.

The available amount of energy may be represented by the available level of power and a respective duration for which the available level of power is supplied.

The amount of energy may be a total amount of energy of the wind park derived from the available individual amount energy of each of the energy storage systems.

According to an embodiment, the storage system state information may comprise information indicative of a deployable capacity of the energy storage system, wherein the deployable capacity is that portion of capacity of the respective energy storage system that is available for use in the combined energy storage system.

In an embodiment, the wind park or the associated wind turbine is operable in a first operation mode in which the associated wind turbine is connected/coupled to the grid and/or operable in a second operation mode in which the associated wind turbine is disconnected/uncoupled from the grid.

According to an embodiment, the deployable capacity of the energy storage system is based on a parameter that is indicative of a reserve margin of energy of that energy storage system from which the storage system state information is obtained. Further the associated wind turbine of the energy storage system is operable in the second operation mode in which the wind turbine is disconnected from the grid, and the reserve margin of energy is an amount of energy reserved for operating the associated wind turbine in the second operation mode. Furthermore, the method comprises determining the reserve margin of energy.

In an embodiment, the second operation mode of the wind turbine may be an operation mode in which the wind turbine is operated while being disconnected from the grid, in particular disconnected from an external grid, such that electrical grid power is no longer present. The second operation mode may comprise that the power supply of the auxiliary system of the wind turbine is maintained. The second operation mode may and/or may not comprise that the wind turbine generates electrical power (e.g., islanding) which may be used in order to supply (at least partially) the wind turbine with electrical power. In an embodiment, the generated electrical power may further be provided to the energy storage system associated with the wind turbine during islanding.

The reserve margin of energy may additionally comprise a portion that is an amount of energy required to switch the wind turbine into to the second operation mode. Determining the reserve margin of energy for the energy storage system may further comprise determining the amount of energy required to switch the wind turbine into the second operation mode.

For example, the amount of energy required to switch the wind turbine into to the second operation mode is in the following equation referred to as 'energy for initiating operation' and may be computed by the equation

[energy for initiating operation in second operation mode]=[energy for 180° yawing]+[energy for positioning pitch system for operation]+[energy consumed during acceleration of rotor to cut-in speed].

The yaw and pitch operation are related to a yaw and pitch operation of the wind turbine.

In an embodiment, the equation for computing the 'energy for initiating operation' may further comprise an additive portion which relates to the energy that is consumed during waiting for such wind conditions that are suitable for the operation of the wind turbine.

The plurality of wind turbines may be operable in the second operation mode and the reserve margin may be determined for each of plural wind turbines. The reserve margin of the combined energy storage system may be the sum of reserve margins of energy and is an amount of energy or level of power that is not available to be provided by the combined energy storage system.

The reserve margin may comprise an amount of energy or level of power that is required to electrically supply electrical components comprised in the auxiliary systems of the wind turbines with electrical energy/power while the wind turbines are disconnected from grid, i.e., the second operation mode may be the operation of the wind turbines while being disconnected from the grid. In particular, the reserve margin may be a fixed value or vary depending on actual operating conditions.

According to an embodiment, determining the reserve margin of energy may comprise deriving the reserve margin of energy from a predetermined value, wherein the predetermined value is based on a duration during which the wind turbine operates in the second operation mode on average.

According to an alternative embodiment, determining the reserve margin of energy may be based on a model, wherein the model is configured to map at least a monitored operating condition of the wind turbine onto a parameter indicative of the reserve margin of energy. Further, determining the reserve margin of energy may comprise monitoring an operating condition of the wind turbine to generate the monitored operating condition, mapping the monitored operating condition onto the indicative parameter by the model, and deriving the reserve margin of energy based on the indicative parameter.

Accordingly, the first alternative may be based on a fixed value, while the second alternative may be based on a dynamic value. Correspondingly, the first alternative may lead to a fixed reserve margin, while the second alternative leads to a dynamic (condition-based) reserve margin.

The operating condition may be an actual wind speed.

According to an embodiment, the storage system state information comprises a parameter that is indicative of a reserve margin of energy of that energy storage system from which the storage system state information is obtained. Further, the method may comprise monitoring an operating condition of the energy storage system from which the storage system state information is obtained to generate a monitored operating condition, deriving the amount of energy of the energy storage system that is available to be provided by the energy storage system based at least on the monitored operating condition and the parameter indicative of the determined reserve margin, and providing the derived available amount of energy in the storage system state information.

In an embodiment, monitoring the operating condition comprises at least one of monitoring a state of charge of the energy storage system to generate a monitored state of charge, and monitoring a state of health of the energy storage system to generate a monitored state of health. In an embodiment, monitoring the state of charge and the state of health to generate the operating condition comprising both the monitored state of health and the monitored state of charge, and deriving the amount of available energy is based on an equation E=SOC*SOH*RC−RM, wherein SOC is the monitored state of charge, SOH is the monitored state of health, RC is the nameplate capacity of the energy storage system and RM is the determined reserve margin.

It should be clear that the available amount of energy may be determined at each of plural energy storage systems and provided in the storage system state information and that the sum of the available amount of energy of each of plural energy storage systems may be the available amount of energy of the combined energy storage system.

According to an embodiment, the method further comprises determining a level of power that is available to be provided by the combined energy storage system, wherein determining the level of power further comprises monitoring for each energy storage system of plural energy storage systems an operating condition to generate a monitored operating condition, deriving for each of the energy storage systems an individual level of power that is available to be provided by the energy storage system based on the monitored operating condition and deriving the level of power that is available to be provided by the combined energy storage system based on the individual levels of power derived for each of the energy storage systems.

The operating condition may comprise at least one of a temperature, an actual power provision capability of the energy storage system, a charging state of the energy storage system and a health state of the energy storage system. The operating conditions may alternatively or additionally comprise a health state of individual battery cells for such energy storage system which is based on a battery technology. The operating condition may alternatively or additionally comprise a power requirement of a load coupled to the energy storage system that is supplied in parallel with electrical power such that the available level of the energy storage system is reduced.

According to an embodiment, the method further comprises requesting the storage system state information from at least a portion of the plural energy storage systems, and in response receiving the requested storage system state information from the respective energy storage systems.

In an embodiment, the method may further comprise monitoring at each of the plural energy storage systems the available amount of energy and stopping to provide energy from an energy storage system of the plural energy storage systems, the available amount of energy of which is close to zero. It may be stopped when the available amount of energy falls below a predetermined threshold or dynamic threshold, e.g., when the available amount of energy falls below 30 kWh for the energy storage system having a nameplate capacity of 150 kWh. Alternatively, it may be stopped when the charging state of the energy storage falls below 10% or below 5%.

According to an embodiment, a control system for controlling an operation of energy storage systems of a wind park is provided. The wind park comprises a plurality of energy storage systems each of which is associated with a wind turbine comprised by the wind park and each of the plural energy storage systems is configured to be operable to provide electrical energy to an auxiliary system of the associated wind turbine. Furthermore the control system is configured to perform the steps of obtaining for each of the energy storage systems storage system state information indicating an availability of the energy storage system to store and/or provide electrical energy, operating the plural energy storage systems as a combined energy storage system based on the obtained storage system state information, and controlling the providing of electrical energy from the combined energy storage system and/or the storing of electrical energy in the combined energy storage system.

The control system may further be configured to perform any of the methods described herein.

The control system may for example include the processing unit and a memory, the memory storing control instructions which when executed by the processing unit of the control system, cause the control system to perform any of the methods described herein. The processing unit may for example include a digital signal processor, an application specific integrated circuit, a field programmable gate array, a microprocessor or the like.

The memory may include RAM, ROM, Flash Memory, a hard disk drive and the like.

The control system may be a master or central control system.

The control system may comprise a plurality of control systems and a master control system, wherein each of the plurality of control systems may be communicatively coupled with or comprised in one of the plurality of energy storage systems and further communicatively coupled with the master control system. Each of the plurality of control systems and the master control system may comprise a processing unit and a memory unit. The control system may be configured to perform any of the methods described herein, wherein steps of the method may be performed distributed over the plurality of control systems and the master control system.

The master control system may for example be a control system on wind park level, e.g., a wind park server. For example, the master control system may communicate directly with a control system communicatively coupled with or comprised in an energy storage system or it may communicate with the control system of the energy storage system via a control system which is communicatively coupled with or comprised in a wind turbine and to which both the energy storage system and the master control system are communicatively coupled.

According to an embodiment of the invention, a wind park is provided, wherein the wind park comprises a plurality of energy storage systems each of which is associated with one of plural wind turbines comprised by the wind park, and wherein each of the plural energy storage systems is configured to be operable to provide electrical energy to an auxiliary system of the one wind turbine and a control system according to any of the control systems described herein.

It should be clear that the wind park may comprise plural sets of wind turbines, wherein each of plural sets comprises one or more wind turbines of the wind park, wherein each set comprises different wind turbines of the wind park, and wherein each of plural sets is associated with an individual control system controlling the respective set.

According to an embodiment of the invention an energy storage system is provided. The energy storage system is coupled with a wind turbine and a grid. Further, the energy storage system is configured to be operable to provide electrical energy to the wind turbine, in particular to an auxiliary system of the wind turbine, and the grid. Further, the energy storage system is configured to be operable to serve both an off-grid service while the wind turbine is disconnected from the grid and an on-grid service while the wind turbine is connected to the grid.

According to an embodiment of the invention, a computer program product (non-transitory computer readable storage medium having instructions, which when executed by a processor, perform actions) for controlling an operation of energy storage systems of a wind park is provided. The wind park comprises a control system configured to operate the energy storage systems, wherein the computer program comprises control instructions which, when executed by a processing unit of the control system, cause the control system to perform any of the methods described herein.

The computer program may be provided on a volatile or non-volatile storage medium or data carrier.

It is to be understood that the features mentioned above and those yet to be explained below can be used not only in the respective combinations indicated, but also in other combinations or in isolation, without leaving the scope of embodiments of the present invention. In particular, the features of the different aspects and embodiments of the invention can be combined with each other unless noted to the contrary.

BRIEF DESCRIPTION

Some of the embodiments will be described in detail, with references to the following Figures, wherein like designations denote like members, wherein:

FIG. 4 is a schematic flow diagram illustrating a method of controlling an operation of energy storage systems of a wind park according to an embodiment.

DETAILED DESCRIPTION

Figure 1:
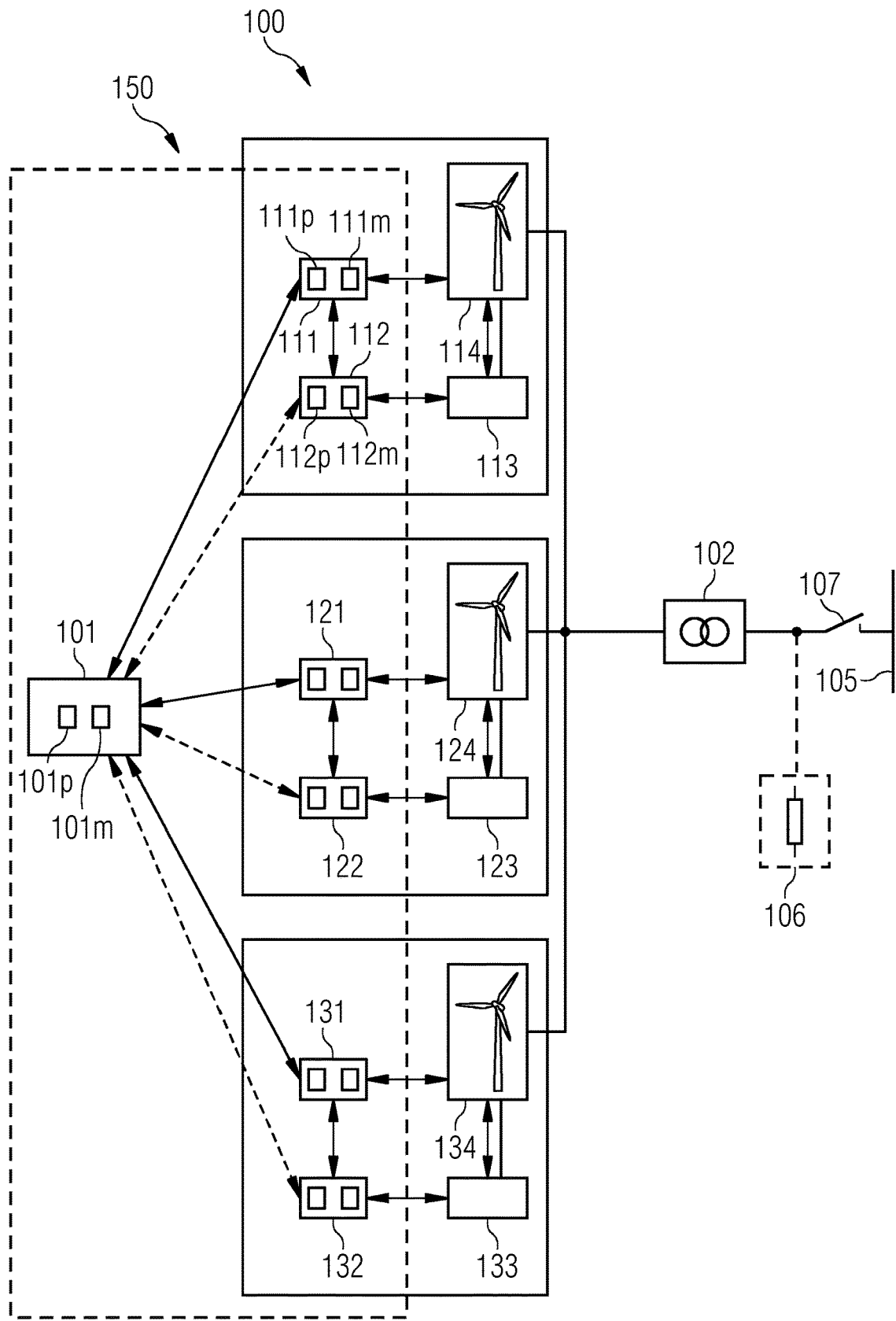
FIG. 1 is a schematic drawing illustrating a control system and controlled energy storage systems comprised in a wind park according to an embodiment.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the conventional art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

It should be clear that descriptions and explanations herein which are limited to specific energy storage systems and/or wind turbines may be applied to other/all energy storage systems and/or wind turbines of a wind park comprising the specific energy storage systems and/or wind turbines, even if such other/all energy storage systems and/or wind turbines are not shown in the respective figure.

A 'grid service' may herein also be referred to as 'grid support service' unless otherwise noted or otherwise indicated by the context.

FIG. 1 is a schematic drawing illustrating a control system 150 and controlled energy storage systems 113, 123, 133 comprised in a wind park 100 according to an embodiment. Each energy storage system 113, 123, 133 is electrically and communicatively coupled with an associated wind turbine 114, 124, 134. The energy storage systems 113, 123, 133 and the associated wind turbines 114, 124, 134 are further electrically coupled with an external grid 105. Both the energy storage systems and the wind turbines may be operable to receive electrical energy/power from the grid 105 or provide electrical energy to the grid 105. An exemplary topology is shown in FIG. 1, according to which the energy storage systems are coupled bidirectionally with the wind turbines and, according to which the wind turbines are coupled bidirectionally with the grid 105 via transformer unit 102. In an alternative embodiment, the energy storage systems may be coupled bidirectionally to the grid, the energy storage systems bypassing the wind turbines. Optionally, a load 106 may further be supplied with electrical energy/power independently on a state of switch 107 from each of at least one of the wind turbines and at least one of the energy storage systems. The wind park 100 may be disconnected or connected with the grid 105 by the switch 107. Thus, a first operation mode may be an operation mode in which the wind park is grid coupled/connected (on-grid operation: closed switch 107) and a second operation mode may be an operation mode in which the wind park is grid uncoupled/disconnected (off-grid operation: open switch 107). The off-grid operation may herein also be referred to as grid-disconnected operation mode. Each wind turbine 114, 124, 134 is further communicatively coupled with and controlled by a respective wind turbine controller 111, 121, 131. Each energy storage system 113, 123, 133 is further communicatively coupled with and controlled by a respective energy storage system controller 112, 122, 132. The wind turbine controllers 111, 121, 131 may further be communicatively coupled with the energy storage system controllers 112, 122, 132. The wind park 105 comprises further a wind park controller 101 operating on wind park level which may for example be a wind park server. The wind park controller 101 is communicatively coupled with the energy storage system controllers 112, 122, 132 and/or with the wind turbine controllers 111, 121, 131. The controllers may be arranged inside or outside of that system to which the controllers are respectively coupled. The controllers are comprised in the control system 150 and each of the controllers comprises a processing unit and a memory unit. The processing unit of wind turbine controller 111, energy storage system controller 112 and wind park controller 101 is exemplarily indicated as processing unit 111p, processing unit 112p and processing unit 101p, respectively. The memory unit of wind turbine controller 111, energy storage system controller 112 and wind park controller 101 is correspondingly indicated as processing unit 111m, processing unit 112m and processing unit 101m, respectively.

During the on-grid operation, the energy storage systems may be operated by the control system 150 such that at least a portion of available energy stored in the energy storage systems is provided to the grid 105 and/or that energy is received and stored from the grid 105, for example to provide energy/power for one or more grid support services. The control system 150 thereby operates at least a portion of, more specifically, at least two of the energy storage systems so as to operate as a combined energy storage system having a higher performance specification, i.e., a higher power rating and/or capacity. The energy/power for the one or more grid support services may supplement the power that is provided by the wind turbines or may be provided by the energy storage systems independently. During the off-grid operation an external power supply of the wind turbines from the grid 105 is absent and the energy storage systems may be operated by the control system 150 such that the wind turbines 114, 124, 134 are supplied with power/energy from the energy storage systems. More specifically, the energy storage systems may individually provide energy/power to the respective associated wind turbines. Thus, relevant components of the wind turbines continue being power supplied during both off-grid and on-grid operation.

Each of the energy storage systems may communicate a storage system state information comprising information about an available amount of energy and/or level of power that may be used for the grid services. The grid services may include but not be limited to the supply of power for a grid black start, a grid frequency support, a reactive power support, a virtual inertia, or any other support service. The energy storage systems may be charged during periods of high wind speeds or the time of night and discharged during periods of low wind speeds or the time of day. The storage state information from the energy storage systems 113, 123, 133 may be communicated via the respective wind turbines 114, 124, 134 or communicated directly to the wind park controller 101. The wind park controller 101 may then determine a power output and duration of power based on the obtained storage state information that is available to be provided/stored collectively from the distributed energy storage system, i.e., from the combined energy storage system. The wind park controller 101 may thereby consider losses in the wind park system besides the information obtained from the individual energy storage systems about the available energy/power. A fault in an energy storage system or wind turbine that may prevent a provision or storage of energy, i.e., a fault which prevents the energy storage system to contribute to the combined energy storage system, may further be communicated to and noted by the wind park controller 101 comprised in the control system 150.

The control system 150 may respond to a received demand for a grid-support service by sending a signal by the wind park controller 101 to one or more wind turbine controllers 111, 121, 131 or energy storage system controllers 112, 122, 132. The signal may comprise a request to provide to the grid or store from the grid an amount of power (active or reactive). The signal may further comprise a duration for which the power is to be provided. The control system 150 may for example fulfill the power request by operating the energy storage systems 113, 123, 133 such that the maximum amount of available power is utilized from a subset of the energy storage systems or such that a portion of the available power is utilized from all wind turbines.

By operating the energy storage systems 113, 123, 133 to act collectively and to utilize the energy/power of the plural energy storage systems the combined energy storage system is emulated that has a higher performance specification than the individual energy storage systems.

Figure 2:
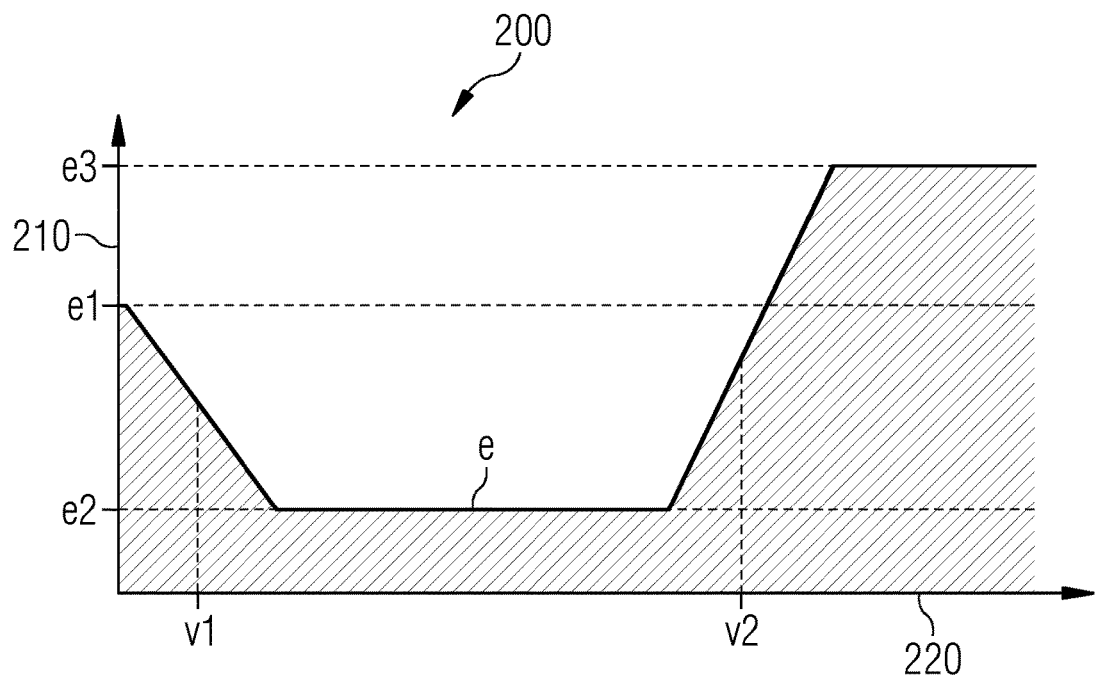
FIG. 2 is a schematic diagram illustrating a relation between an amount of energy reserved in an energy storage system and a wind speed according to an embodiment.

FIG. 2 is a schematic diagram illustrating a relation between an amount of energy reserved in one of the energy storage systems 113, 123, 133 and a wind speed according to an embodiment. The wind speed may be monitored at the wind turbines 114, 124, 134 associated with the energy storage systems 113, 123, 133. Each of the energy storage systems 113, 123, 133 may reserve a portion of stored energy that is not available to be provided when the energy storage systems are operated as the combined energy storage system. That reserve margin of energy may be individual for each energy storage system and reserved to supply the respective associated wind turbine with energy when the respective associated wind turbine operates in the second operation mode, e.g., when the wind turbine is in the off-grid operation. The reserve margin of energy reserved by an energy storage system may thus comprise a first portion that is related to the energy which is required to operate the associated wind turbine in the second operation mode for a specific duration. The first portion of the reserve margin may be a predetermined fixed value or may be derived dynamically. The reserve margin may depend on an actual operation condition of the energy storage system or the therewith associated wind turbine. Such operation condition may for example be a wind speed, a monitored wind speed that is monitored at or close to the wind turbine or, more generally, in the wind park. Depending on the wind speed, the reserve margin may account for the energy that may be required to keep the wind turbine powered during wind conditions which are outside of the operation wind speed range, i.e., during periods in which the wind turbine cannot generate (enough) power to power supply itself (e.g., during islanding). The amount of required energy may be a fixed value based on the statistically most likely duration during which the wind turbine is unable to operate. The amount of required energy may further comprise a variable portion, i.e., be alternatively a variable value. The amount of required energy may then depend on the wind speed. It may for example depend on the operation effort required to operate the wind turbine at specific wind speed situations, e.g., it may depend on the protective operation effort in high wind speed situations. The required amount of energy to maintain a power supply to the wind turbine may for example vary then in dependence on the applied yaw strategy at high winds. In such situation the wind turbine may need to maintain actively (power consuming) an alignment with the wind direction during a storm. The required energy may further be dependent on a wind speed dependent expected duration of the wind speed situation. For example, it may vary based on the likelihood for a long duration at low wind speeds if the low wind speeds may persist for a significant period of time. A model which represents the reserved energy e depending on the wind speed is exemplarily illustrated in FIG. 2. The reserved energy e is the amount of energy which is reserved to operate the wind turbine in the second operation mode. The diagram has a vertical axis 210 related to the reserved energy amount and a horizontal axis 220 related to the wind speed. A cut-in wind speed v1 and a cut-out wind speed v2 corresponding to an exemplary operation of one of the wind turbines 114, 124, 134 are indicated on the wind speed axis 220. The values of the cut-in wind speed v1 and the cut-out wind speed v2 may be around 3 m/s and 25 m/s, respectively. The cut-in wind speed v1 and the cut-out wind speed v2 separate the diagram in three sections: a first section related to wind speeds below the cut-in wind speed v1, a second section related to wind speeds from cut-in wind speed v1 to cut-out wind speed v2, and a third section related to wind speeds above the cut-out wind speed v2. Further, a first reserved energy amount e1, a second reserved energy amount e2 and a third energy amount e3 are indicated on the reserved energy amount axis 210. The first section of the diagram may represent a wind turbine that is out of operation and/or unable to power supply itself due to the low wind speeds. Thus, the relevant components of the wind turbine 114, 124, 134 that are not allowed to be powered off continue to be power supplied by the respective energy storage system 113, 123, 133. According to the embodiment of the model as shown in FIG. 2, the reserved energy amount e1 may be determined as follows. The reserved energy amount e1 is the energy which is required for maintaining the operation of at least the auxiliary system of the wind turbine 114, 124, 134 while the wind turbine is out of operation for a statistically significant duration of low wind. In many regions of the world 72 hours of low wind below the cut-in wind speed Vin has a likelihood to occur only once in 50 years and may therefore be exemplary used as a (conservative) duration of low winds for determining the reserved energy amount e1. In summary, the reserved energy amount e1 may be determined as the result of a multiplication of a (conservative) average power requirement while the wind turbine is out of operation and a (conservative) average/most likely duration during which the wind turbine is out of operation.

According to FIG. 2, the reserve energy amount e falls from the start point of the first section from the level of the reserve energy amount e1 to the level of the reserve energy amount e2. In this section the model considers that the expected duration of low wind speeds decreases and/or that the wind turbine 114, 124, 134 may be able to provide a portion of the required power/energy by itself upon reaching a level beyond the cut-in wind speed v1. That portion may increase with higher wind speeds. Accordingly, the reserved energy amount e may fall until the level of reserved energy amount e2. The horizontal part of the graph in the second section of the diagram (level of the reserve energy amount e2) thus represents that the wind turbine 114, 124, 134 is able to power supply itself due to wind speeds which are positioned in the range between the cut-in wind speed v1 and the cut-out wind speed v2. Still, a specific amount of energy may be reserved to switch the wind turbine into the grid-disconnected operation mode. The reserved energy amount e2 may hence be determined as follows. The reserved energy amount e2 is the energy, which is required by the wind turbine 114, 124, 134 during a transition between the on-grid to off-grid operation. In special embodiments, the required energy defined by reserved energy amount e2 may be reduced until 0 kWh if the transition is highly efficient.

According to FIG. 2, the reserve energy amount e rises from a start point which positioned in an area below the cut-out wind speed v2 in the second section until it reaches a saturation region in the third section. The saturation region is the horizontal line of the graph that represents the level of the reserve energy amount e3. In this section the model considers that the required energy may raise due to the above-mentioned increasing operation effort during situations of higher wind.

According to the embodiment of the model, the reserved energy amount e3 thus extends the reserved energy amount e2 as follows. The reserved energy amount e3 further comprises the energy which is required for maintaining a yaw alignment of the wind turbine during high winds or storms. The duration of high winds or storms may correspondingly be determined as an average duration or most likely duration of high winds which are empirically or statistically predetermined. For example, energy may be required for 6 hours of yaw alignment during a storm to comply with load reducing requirements from leading wind turbine design standards such as IEC 61400-1.

The reserve margin may further comprise a second portion which is required to switch into the second operation mode, i.e., the reserve margin is the derived by the equation

[reserve margin]=[energy required for operating in
second operation mode]+[energy required for
initiating operation in second operation mode].

The value of the parameter [energy required for operating in second operation mode] may for example be the required energy in an operation mode in which the wind turbine operates in off-grid operation or is even out of operation and grid disconnected, e.g., due to high or low wind speed situations.

As mentioned, the value of the parameter [energy required for operating in second operation mode] may be a fixed value or a wind-speed dependent value based on the model representing the dependence between wind speed and reserved energy as shown in FIG. 2.

The value of the parameter [energy required for initiating operation in second operation mode] of an energy storage system that power supplies a wind turbine during off-grid operation, may for example be determined by an equation

[energy for initiating operation in second operation
mode]=[energy for 180° yawing]+[energy for
positioning pitch system for operation]+[energy
consumed during acceleration of rotor to cut-in
speed].

In an embodiment, the equation for computing the 'energy for initiating operation' may further comprise an additive portion which relates to the energy that is consumed during waiting for such wind conditions that are suitable for the operation of the wind turbine. Such additive portion may result in an increased reserve margin at very low and very high wind speeds during which the wind turbine is not allowed to be operated.

The actual available energy of an energy storage system may then be derived based on the determined reserve margin by an equation

[available energy]=[SoC]*[SoH]*[nameplate capacity]−[reserve margin], wherein SoC is the state-of-charge of the energy storage system and SoH is the state-of-health of the energy storage system.

Figure 3:
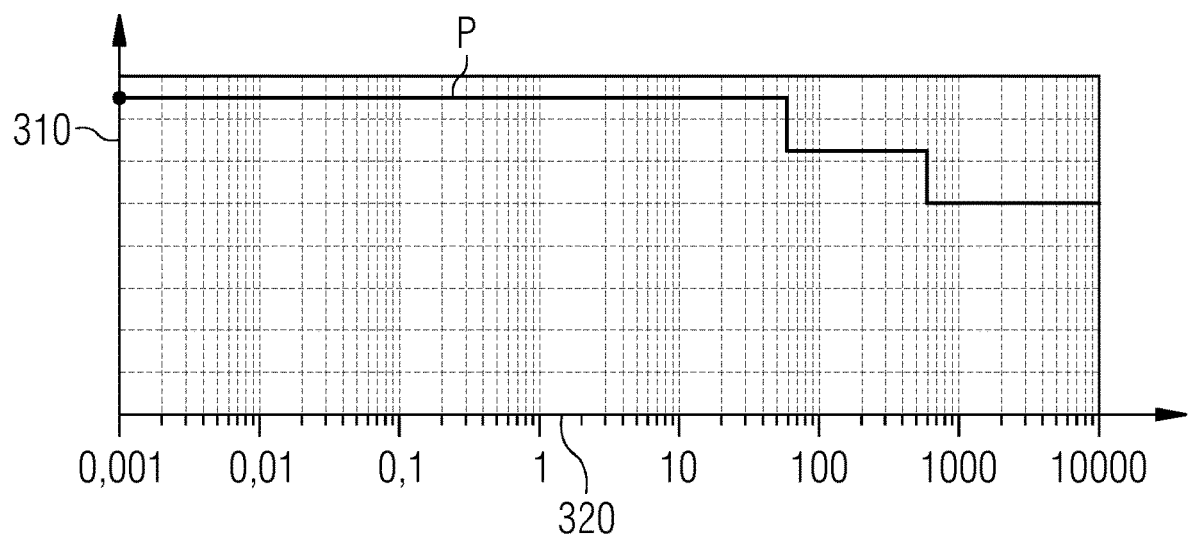
FIG. 3 is a schematic diagram illustrating a relation between an available level of power of an energy storage system and a duration of discharge of the energy storage system.

FIG. 3 is a schematic diagram illustrating a relation between an available level of power P of one of the energy storage systems 113, 123, 133 and a duration of discharge of the one energy storage system. The diagram has a vertical axis 310 representing power and a horizontal axis 320 representing time. The graph P shows the amount of power that the energy storage system is capable to provide. The amount of provided power P depends on a duration of discharge. According to FIG. 3, the energy storage system can supply a high level of power from 0 to 60 s, a medium-high level of power for 60 s to 600 s and a nominal level of power for 600 s or more. This nominal level of power is typically the power rating of the energy storage system. The varying power output capabilities of the energy storage systems of the wind park 100 may thus be considered by control system 150. The varying power output capability of the individual energy storage systems may be (predictively) determined, e.g., based on monitoring, and integrated into the determining of the available energy/power that may be provided by the combined energy storage system. This may further comprise to consider other factors which may have an influence on the power capability of the individual energy storage systems such as a condition of the energy storage media (e.g., temperature or state-of-health).

FIG. 4 is a schematic flow diagram illustrating a method 400 of controlling an operation of energy storage systems of a wind park according to an embodiment. The wind park may comprise a plurality of energy storage systems each of which is associated with one of plural wind turbines comprised by the wind park. Further, each of the plural energy storage systems may be configured to be operable to provide electrical energy to an auxiliary system of the one associated wind turbine. According to a step S1 of method 400, storage system state information indicating an availability of the energy storage system to store and/or provide electrical energy is obtained for each of the energy storage systems. According to a step S2, an available amount of energy or available level of power of the combined energy storage system is determined. Determining the amount of energy or level of power comprises deriving the available amount of energy or available level of power based on the obtained storage system state information. According to a step S3, the plural energy storage systems are operated as a combined energy storage system based on the obtained storage system state information. According to a step S4, the providing of electrical energy from the combined energy storage system and/or the storing of electrical energy in the combined energy storage system is controlled.

The sequence of the method steps in FIG. 4 is not limited to the shown sequence. In embodiments, the method is further not limited to the shown number of steps. Certain steps of the method may not be carried out, may be replaced or extended.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling an operation of energy storage systems of a wind park, wherein the wind park comprises a plurality of energy storage systems each of which is associated with a wind turbine comprised by the wind park, and wherein each of the plurality of the energy storage systems is configured to be operable to provide electrical energy to an auxiliary system of the associated wind turbine to power the auxiliary system when the wind turbine is disconnected from a power grid, wherein the method comprises:
obtaining for each of the energy storage systems storage system state information indicating an availability of the energy storage systems to store and/or provide the electrical energy;
operating the plurality of the energy storage systems as a combined energy storage system based on the obtained storage system state information; and
controlling the providing of the electrical energy from the combined energy storage system to the power grid and/or to a load, and/or the storing of the electrical energy in the combined energy storage system;
wherein the controlling of the providing of the electrical energy from the combined energy storage system includes maintaining a reserve margin of energy in at least some of plurality of the energy storage systems, the reserve margin of energy being an amount of energy reserved for powering the auxiliary system of the associated wind turbine when the wind turbine is disconnected from the power grid.

2. The method according to claim 1, wherein the method further comprises:
operating the plurality of the energy storage systems such that each energy storage system provides the electrical energy to the associated wind turbine when the wind park is disconnected from the power grid.

3. The method according to claim 1, wherein each energy storage system is configured to be operable to provide the electrical energy to the power grid and/or the load, and wherein the method comprises controlling the combined energy storage system to provide stored electrical energy to the power grid and/or load, and/or to store the electrical energy received from the power grid.

4. The method according to claim 3, wherein the method comprises:
performing a grid service by the controlling of the combined energy storage system, wherein the grid service is at least one of a grid black start, a grid frequency support, a reactive power support, a virtual inertia, and energy arbitrage.

5. The method according to claim 1, wherein the combined energy storage system is controllable to provide and/or store the electrical energy to perform a plurality of services, wherein a first service is associated with a higher priority than a second service, wherein the method further comprises:
providing a larger fraction of a storage capacity of the combined energy storage system for the first service than for the second service, and/or reserving a predetermined amount of storage capacity of the combined energy storage system for use by the first service.

6. The method according to claim 1, wherein the method further comprises:
monitoring one or more prediction parameters to generate one or more monitored prediction parameters;
predicting based at least on the one or more prediction parameters a schedule of upcoming energy demands of providing and/or storing the electrical energy; and
adjusting the controlling of the providing and/or storing of the combined energy storage system based on the schedule.

7. The method according to claim 1, wherein the method further comprises:
determining an available amount of energy or available level of power of the combined energy storage system, wherein determining the amount of energy or level of power comprises; and
deriving the available amount of energy or available level of power based on the obtained storage system state information.

8. The method according to claim 1, wherein the storage system state information comprises information indicative of a deployable capacity of the respective energy storage system, wherein the deployable capacity is that portion of capacity of the respective energy storage system that is available for use in the combined energy storage system.

9. The method according to claim 8, wherein the deployable capacity of the energy storage system is based on a parameter that is indicative of the reserve margin of energy of that energy storage system from which the storage system state information is obtained, and wherein the associated wind turbine of the energy storage system is operable in a grid disconnected operation mode in which the wind turbine is disconnected from the grid, and the reserve margin of energy is an amount of energy reserved for operating the associated wind turbine in the grid disconnected operation mode, and wherein the method further comprises
determining the reserve margin of energy.

10. The method according to claim 9, wherein determining the reserve margin comprises:
deriving the reserve margin of energy from a predetermined value, wherein the predetermined value is based on a duration during which the wind turbine operates in the grid disconnected operation mode on average, or,
wherein determining the reserve margin of energy is based on a model, wherein the model is configured to map at least a monitored operating condition of the wind turbine onto a parameter indicative of the reserve margin of energy, and wherein determining the reserve margin of energy comprises:
monitoring an operating condition of the wind turbine to generate the monitored operating condition;
mapping the monitored operating condition onto the indicative parameter by the model; and
deriving the reserve margin of energy based on the indicative parameter.

11. The method according to claim 1, wherein the storage system state information comprises a parameter that is indicative of the reserve margin of energy of that energy storage system from which the storage system state information is obtained, the method further comprising:

monitoring an operating condition of the energy storage system from which the storage system state information is obtained to generate a monitored operating condition;

deriving the amount of energy of the energy storage system that is available to be provided by the energy storage system based at least on the monitored operating condition and the parameter indicative of the determined reserve margin; and providing the derived available amount of energy in the storage system state information.

12. The method according to claim 1, wherein the method further comprises:

determining a level of power that is available to be provided by the combined energy storage system, wherein determining the level of power further comprises:

monitoring for each energy storage system of plurality of the energy storage systems an operating condition to generate a monitored operating condition;

deriving for each of the energy storage systems an individual level of power that is available to be provided by the energy storage system based on the monitored operating condition; and deriving the level of power that is available to be provided by the combined energy storage system based on the individual levels of power derived for each of the energy storage systems.

13. The method according to claim 1, wherein the method further comprises:

requesting the storage system state information from at least a portion of the plurality of the energy storage systems; and in response receiving the requested storage system state information from the respective energy storage systems.

14. A control system for controlling an operation of energy storage systems of a wind park, wherein the wind park comprises a plurality of energy storage systems each of which is associated with a wind turbine comprised by the wind park, and wherein each of the plurality of the energy storage systems is configured to be operable to provide the electrical energy to an auxiliary system of the associated wind turbine to power the auxiliary system when the wind turbine is disconnected from a power grid, wherein the control system is configured to perform:

obtaining for each of the energy storage systems storage system state information indicating an availability of the energy storage system to store and/or provide the electrical energy;

operating the plurality of the energy storage systems as a combined energy storage system based on the obtained storage system state information; and controlling the providing of the electrical energy from the combined energy storage system to the power grid and/or to a load and/or the storing of the electrical energy in the combined energy storage system, wherein the controlling of the providing of the electrical energy from the combined energy storage system includes maintaining a reserve margin of energy in at least some of the energy storage systems, the reserve margin of energy being an amount of energy reserved for powering the auxiliary system of the associated wind turbine when the wind turbine is disconnected from the power grid.

15. A computer program product, comprising a computer readable hardware storage device having computer readable program code stored therein, said program code executable by a processor of a computer system to implement a method for controlling an operation of energy storage systems of a wind park, wherein the wind park comprises a control system configured to operate the energy storage systems, wherein the computer program comprises control instructions which, when executed by a processing unit of the control system, cause the control system to perform the method according to claim 1.

* * * * *